United States Patent [19]

Häkansson

[11] Patent Number: 4,789,169
[45] Date of Patent: Dec. 6, 1988

[54] ATTACHMENT MEANS FOR A WORK PIECE

[76] Inventor: Nils Häkansson, Alebäcksgatan 5, Lidköping, Sweden, 53141

[21] Appl. No.: 79,772
[22] PCT Filed: Oct. 30, 1986
[86] PCT No.: PCT/SE86/00499
    § 371 Date: Jul. 1, 1987
    § 102(e) Date: Jul. 1, 1987
[87] PCT Pub. No.: WO87/02615
    PCT Pub. Date: May 7, 1987

[30] Foreign Application Priority Data
    Nov. 1, 1985 [SE] Sweden ............... 8505164
    Jan. 31, 1986 [SE] Sweden ............... 850164

[51] Int. Cl.⁴ ............................ B23B 5/22
[52] U.S. Cl. ............................ 279/2 R
[58] Field of Search ............ 279/2 R, 6; 82/49; 242/72 B

[56] References Cited
    U.S. PATENT DOCUMENTS
    629,747  7/1899  Kuttler .
    3,623,741 11/1971 Reeder et al. ............... 82/44 X
    4,342,348 8/1982 Lichtenwalter et al. .
    4,541,465 9/1985 Leadbeatter ............... 279/2 R X FOREIGN PATENT DOCUMENTS
    8500190  8/1985  Australia .
    0108493  5/1984  European Pat. Off. .
    8000737  4/1980  PCT Int'l Appl. ............ 279/2 R
    405457  12/1978  Sweden .
    931314   7/1980  U.S.S.R. .

Primary Examiner—Eugene F. Desmond
Attorney, Agent, or Firm—Holman & Stern

[57] ABSTRACT

A chuck adapted to clamp a workpiece (7) during wood turning. The chuck comprises a body (3), at one end attachable to a lathe (1) and at the opposite end having two radially opposed eccenters (8, 9) with equal eccentricity. Each of the eccenters is encompassed by or encompasses a clamping jaw (5, 6) respectively, which are recessed together to form a mutual end surface. The clamping jaws are arranged to be rotatable half a turn in relation to the body (3), wherein they together at one rotational end position form a cylindrical dics, and at the other rotational end position are radially displaced in opposite directions in relation to themselves.

5 Claims, 2 Drawing Sheets

ATTACHMENT MEANS FOR A WORK PIECE

Cross Reference to Related Application(s)

This United States application stems from PCT International Application No. PCT/SE86/00499 filed Oct. 30, 1986.

This invention relates to chucks adapted to clamp a workpiece during wood turning.

This chuck enables quick and easy clamping of a workpiece with good centricity without end support, e.g. for turning of bowls or dishes. The chuck also provides for unlimited repeated fixing and release of a single workpiece with very good repeating accuracy, which often is necessary at some machining operations. It is also possible to reverse rotation, e.g. for polishing, wherein the grindings will spray away from the mouth region and the protective goggles of the operator. The chuck has no protruding parts which can cause damage by engaging a tool, clothings or parts of the body.

The new and characterizing for the chuck according to the invention is disclosed in the accompanying claims.

The invention will now be more fully described with reference to the accompanying drawings, illustrating a preferred embodiment in which.

The chuck according to the invention is assembled around a body 3, which at one end is attachable to a rotating machine. In the disclosed embodiment, this end is drilled and has a thread and a radial guide, adapted to the tool socket 1 of a lathe spindle. At the opposite end the body 3 is formed with two diametrically opposed excenters 8, 9 having equal excentricity.

Each of the excenters in this disclosed embodiment is enclosed by a clamping jaw 5 and 6 respectively, which are recessed together to form a mutual end surface. The clamping jaws are able to rotate half a turn about their respective excenter. They are also designed to together form a cylindrical disc, having the diameter D, when they are turned to the end positions shown in FIG. 2. When the elements are in their other end positions, they are radially displaced in opposite directions in relation to each other. The rotation of the clamping jaws about the excenters is hardly perceptable.

Figure 2:
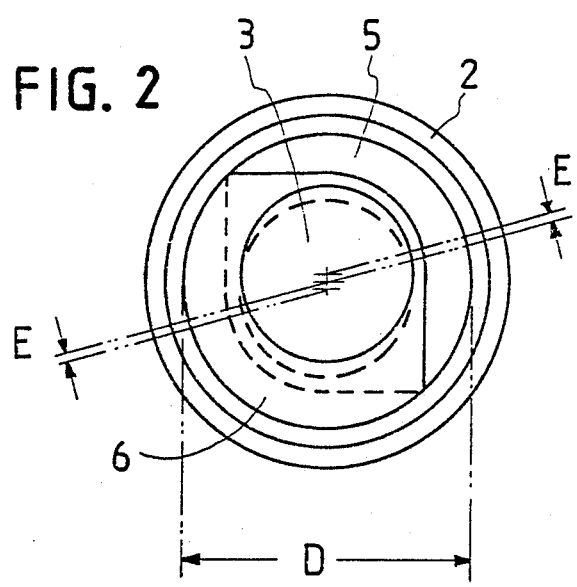
FIG. 2 is an elevational view from the workpiece gripping end of said chuck which in both views is ready to receive a workpiece.
Figure 4:
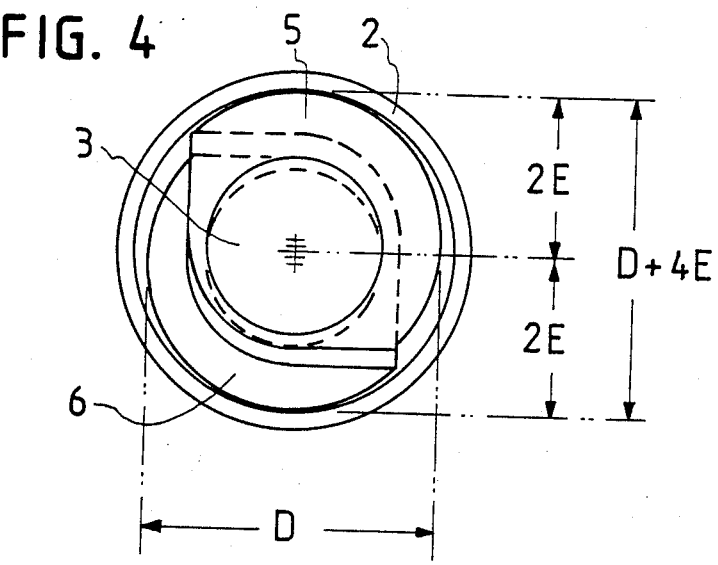

In FIG. 2 the reference E represents the distance between the center line of the body 3 and the center lines of the excenters 8, 9. The distance between the centerlines of the excenters is therefore 2E. If the diameter of the disc is formed when the clamping jaws are in their inner rotational end position is denoted D, the largest distance between the peripheries of the clamping jaws will be D+4E, which occurs when the jaws are in their other rotational end position. This position is shown in FIG. 4.

Figure 1:
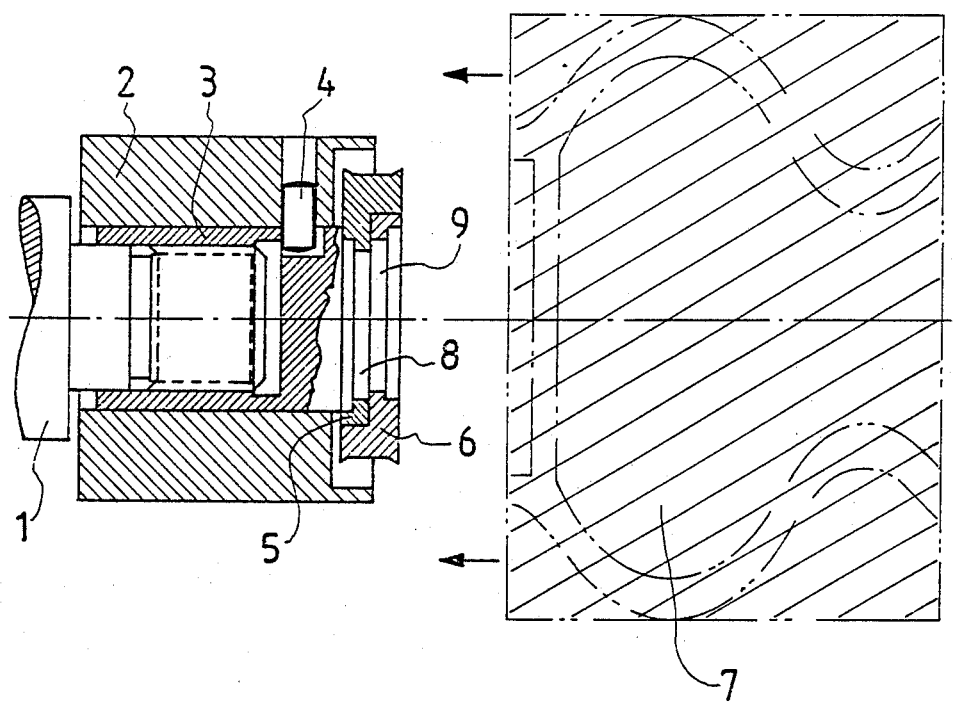
FIG. 1 is a sectional view, seen from the side of the chuck.
Figure 3:
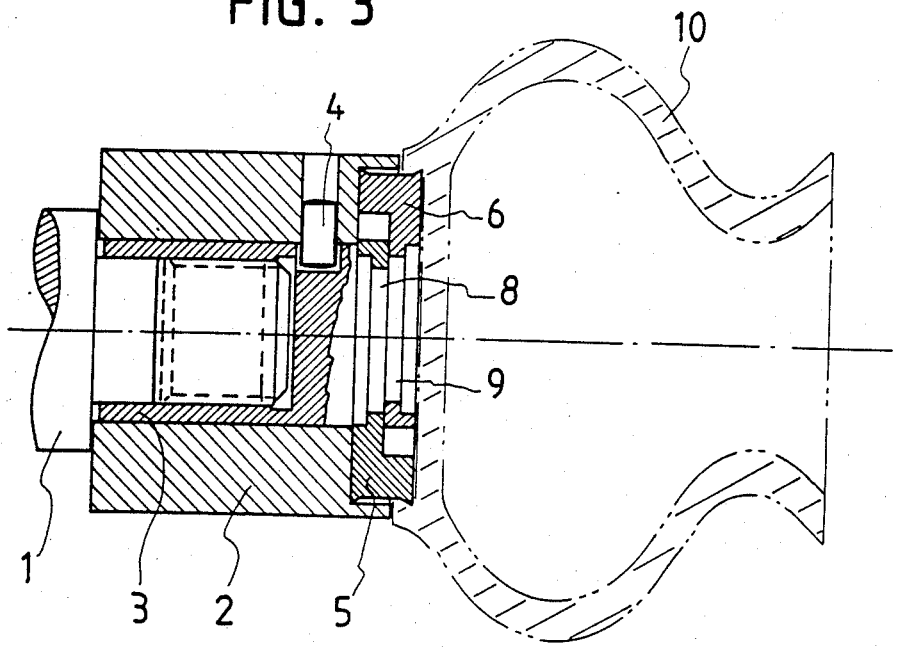
FIGS. 3 and 4 are corresponding views showing the chuck in clamping position with a workpiece.

In the first rotational end position the clamping jaws 5, 6 are ready to receive a wood workpiece 7 for machining, and in the second rotational end position the object 10 is clamped by the jaws. This is shown in FIGS. 1 and 3 respectively.

In the disclosed embodiment, a sleeve 2 is mounted around the body 3, said sleeve being non-rotatably, but axially displaceable in relation to the body. The sleeve has a threaded boring, e.g. for a screw 4 which runs through the wall of the sleeve and projects with its end into a short axial groove in the body 3. The end of the sleeve 2 facing the lathe spindle 1 is so arranged that it always projects beyond the body 3. At the other end of the sleeve, the clamping jaws 5, 6 are partly recessed.

A cylindrical turned cavity having a diameter slightly larger than the diameter D formed by the clamping jaws 5, 6 when they are in their inner rotational end position, must be made in the bottom surface of a wood workpiece 7. The wood workpiece can now be attached to the chuck which has been threaded almost completely on the lathe spindle 1, i.e. so that there is only a small gap between the lathe spindle and the sleeve. The wood workpiece is placed on the chuck with the wall of the cylindrical cavity encompassing the clamping jaws 5, 6. The workpiece is lightly pressed against the chuck and turned, wherein the clamping jaws are also turned making them expand radially to grip the workpiece. Then the chuck is screwed completely on the lathe spindle 1, making the sleeve 2 press firmly against the workpiece and the clamping jaws press together axially and towards the sleeve making it necessary to use a relatively large torsional moment to losen the workpiece from the chuck. In FIG. 3 a machined workpiece 10 is shown in clamped position at a chuck.

The invention is not limited to the above disclosed embodiment, where the gripping jaws 5, 6 are pressed radially outwards while clamping the workpiece. It is equally possible to design the chuck so that the clamping jaws are pressed radially inwards while clamping the workpiece. In that case each of the excenters 8, 9 encompass one clamping jaws 5 and 6 respectively.

With the latter embodiment of the invention, the end of a workpiece which will be clamped must be cylindrical and have a smaller outer diameter than the opening formed by the clamping jaws 5, 6, when these are in their outer rotational end position. The workpiece is slid into the chuck until it is stopped by the end face of the body 3, whereupon it is displaced radially towards the tips of the threads in the opening of the clamping jaws 5, 6 and turned so that the jaws are simultaneously rotated and the distance between them reduced. Now the oblique thread profiles are pressing into the cylindrical surface of the workpiece, so that it is clamped both radially and axially and so that the clamping jaws 5, 6 are prevented to rotate.

I claim:

1. A chuck adapted to clamp a workpiece (7) during wood turning, comprising a rotatable body (3), at one end attachable to a lathe and at the other end having means to clamp the workpiece (7), characterized in, that the body (3) has two radially opposed excenters (8, 9) located one to each side of the longitudinal axis of said body, said excenters being arranged to cooperate with two clamping jaws (5, 6) each of which is rotatable a limited sector in relation to its excenter (8, 9), said jaws being adapted to clamp the workpiece (7) while turned in one direction and release the workpiece while turned in the opposite direction, and wherein the jaws (5, 6) are recessed together to present a mutual end surface to the workpiece (7).

2. A chuck according to claim 1, characterized in, that the end of the body (3) facing the lathe has a drilled hole with internal thread and a radial guide, e.g. adapted to the tool socket (1) of a lathe spindle.

3. A chuck according to claim 2, characterized in, that the body (3) is circumferented by a sleeve (2), which, in relation to said body is non-rotatable but axially displaceable a limited distance.

4. A chuck according to claim 3, characterized in, that the clamping jaws (5, 6) are partly recessed into the sleeve (2) at the excenter (8, 9) end.

5. A chuck according to claim 4, characterized in, that the end of the sleeve (2) that is distal from the excenters (8, 9) extends beyond that end of the body (3) which is attachable to a lathe.

* * * * *